United States Patent [19]
Chelminski

[11] 4,038,630
[45] July 26, 1977

[54] AIRGUN MARINE SEISMIC SURVEY STREAMER METHOD AND APPARATUS

[75] Inventor: Stephen V. Chelminski, West Redding, Conn.

[73] Assignee: Bolt Associates, Inc., Norwalk, Conn.

[21] Appl. No.: 625,886

[22] Filed: Oct. 28, 1975

[51] Int. Cl.² .......................... G01V 1/38; G01V 1/02
[52] U.S. Cl. .................................... 340/7 R; 340/9; 340/17 R; 181/110; 181/111
[58] Field of Search ....................... 181/110, 111, 114; 340/7 R, 9, 12, 17

[56] References Cited

U.S. PATENT DOCUMENTS

| | | | |
|---|---|---|---|
| 1,500,243 | 7/1924 | Hammond | 340/7 R |
| 3,022,852 | 2/1962 | Pavey | 340/7 R |
| 3,176,787 | 4/1965 | Raever | 340/7 R |
| 3,245,032 | 4/1966 | Knott et al. | 181/118 |
| 3,256,501 | 6/1966 | Smith | 340/7 R |
| 3,307,285 | 3/1967 | Wells | 181/118 |
| 3,332,058 | 7/1967 | Loper et al. | 181/118 |
| 3,794,965 | 2/1974 | Charske | 340/7 PC |
| 3,893,539 | 7/1975 | Mott-Smith | 181/111 |
| 3,909,774 | 9/1975 | Pavey | 340/7 PC |

Primary Examiner—Nelson Moskowitz
Attorney, Agent, or Firm—Parmelee, Johnson and Bollinger

[57] ABSTRACT

A method and apparatus for simultaneously towing and handling multiple airguns are disclosed for use in marine seismic surveying which provide for ease in handling large numbers of airguns and enable them to stream out at a desired depth behind a submerged towing head in a long flexible streamer, or a plurality of simultaneously towed airgun streamers, whose level below the surface can be changed, if desired, while the survey is progressing. A plurality of airguns are included in each streamer extending for a length behind the survey vessel for providing an effective geographic diversity in the location of the airguns which can be simultaneously fired, or can be fired with time delay, for generating very powerful large area seismic energy wavefronts travelling down through the body of water. The buoyancy of the airgun streamer is controllable to provide neutral buoyancy during towing, if desired, and slight positive buoyancy to float the streamer in preparation for taking it on board the towing vessel. The streamer can be conveniently hauled on board by hauling along a roller conveyor extending over the stern and can be rolled back along this conveyor for convenient launching into use. In the preferred streamer construction described, each airgun has a generally cylindrical configuration and is of the same diameter, same length and same weight, but its firing chamber volume can be changed and pre-set to various sizes as may be described by the user, and each airgun is axially aligned with and spaced from the neighboring airguns with interconnecting flexible semiinflatable sleeves extending between them.

28 Claims, 14 Drawing Figures

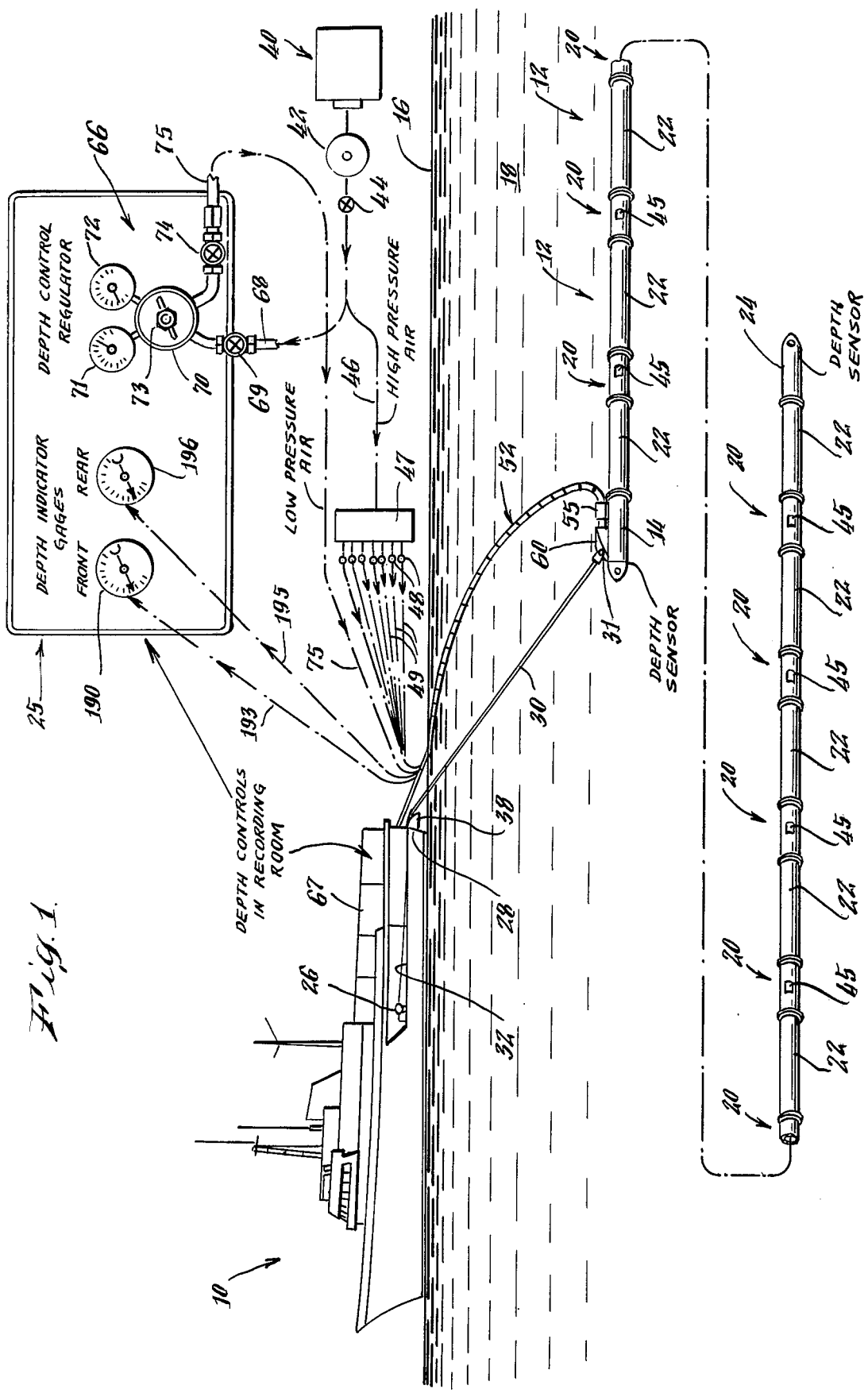

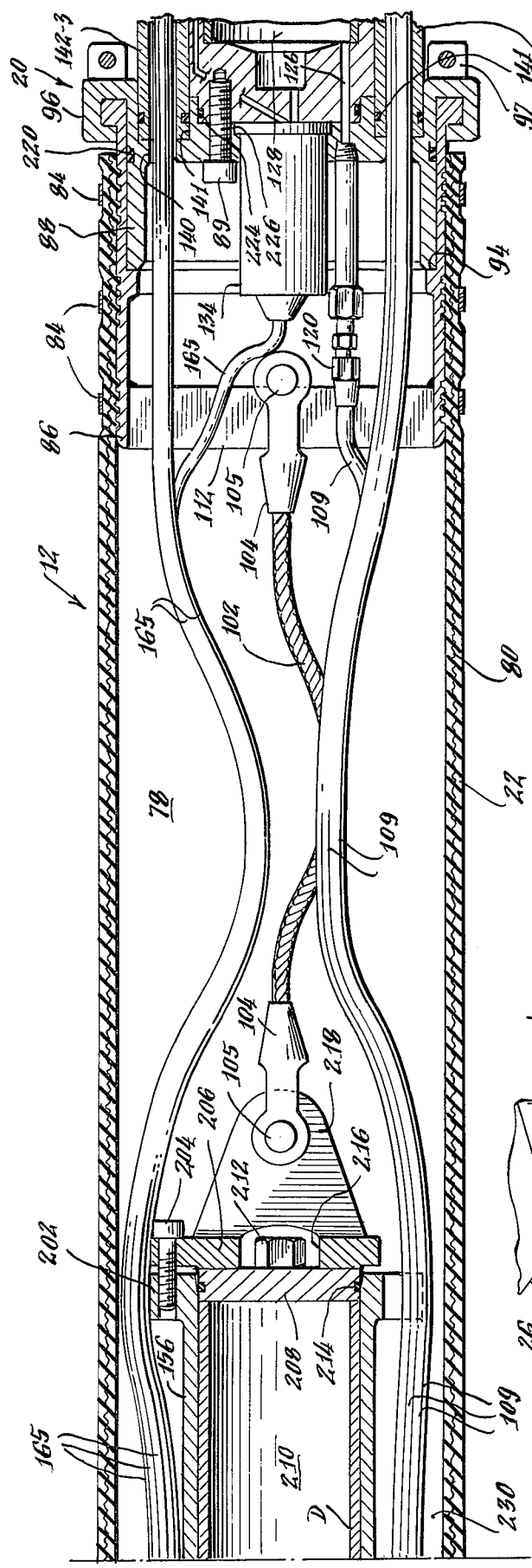
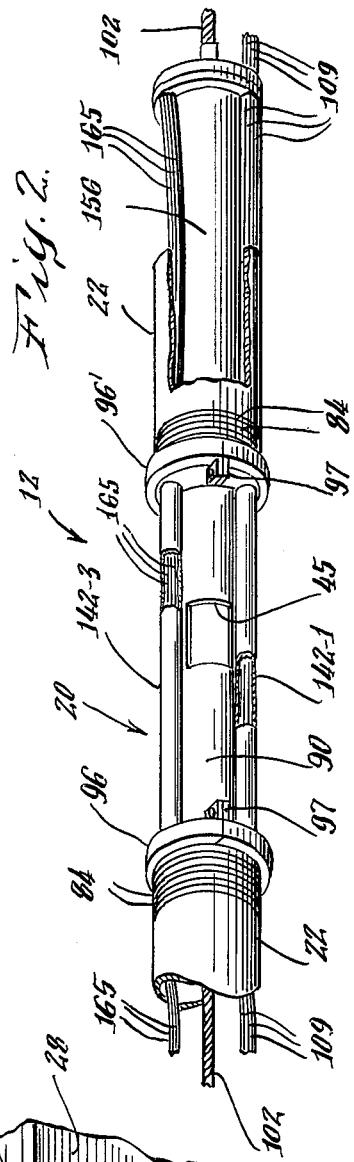
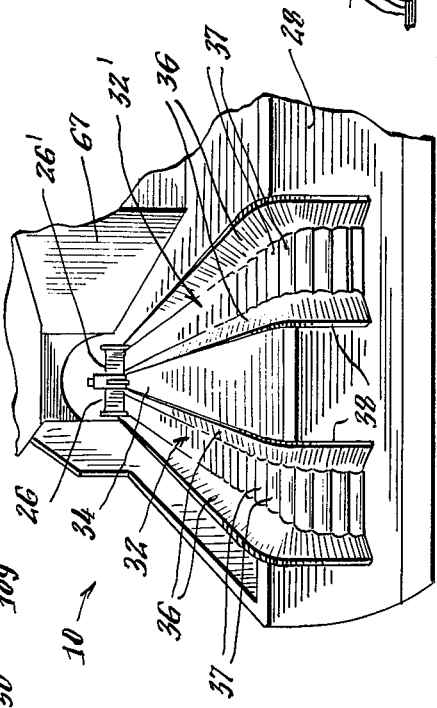

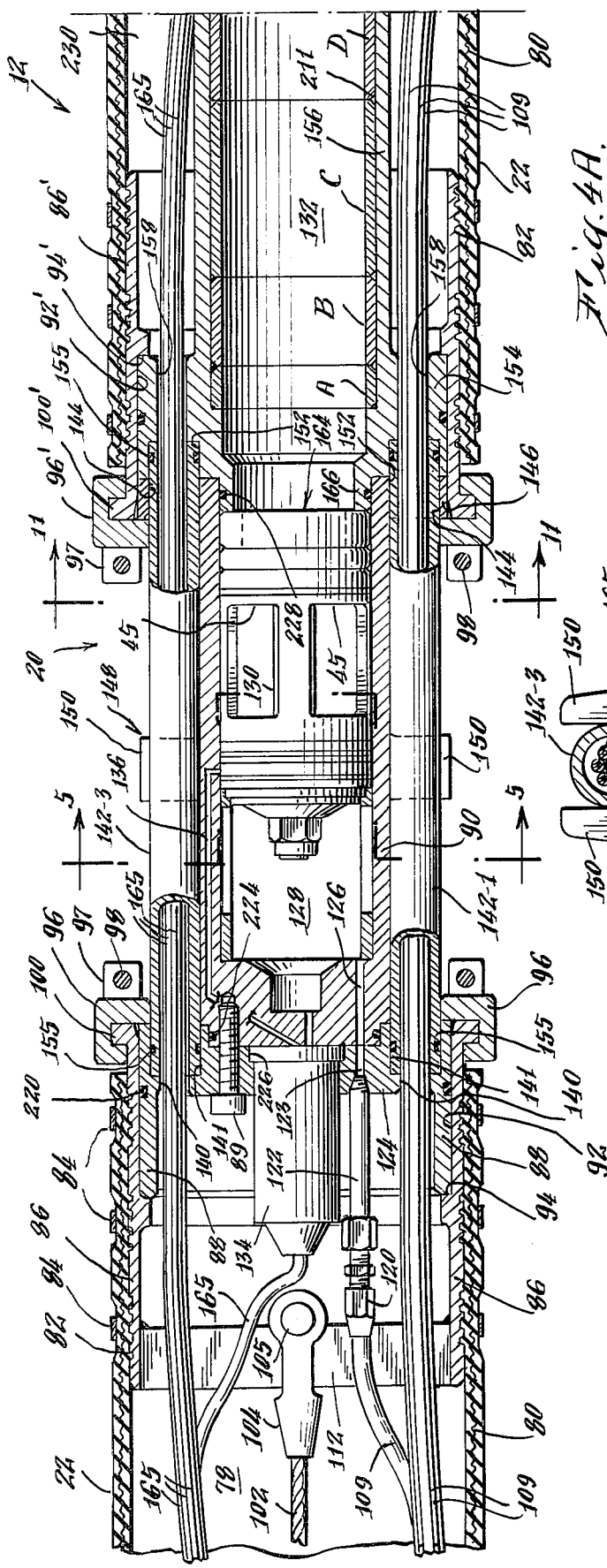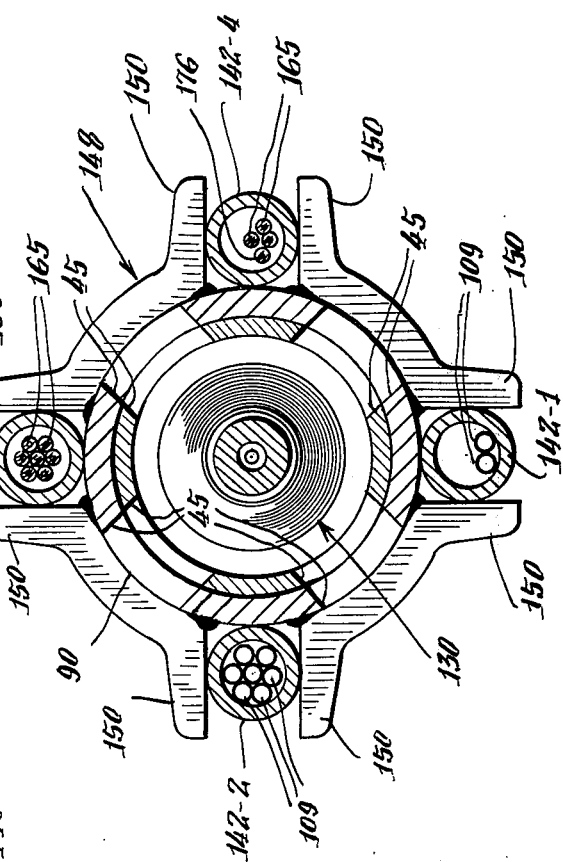

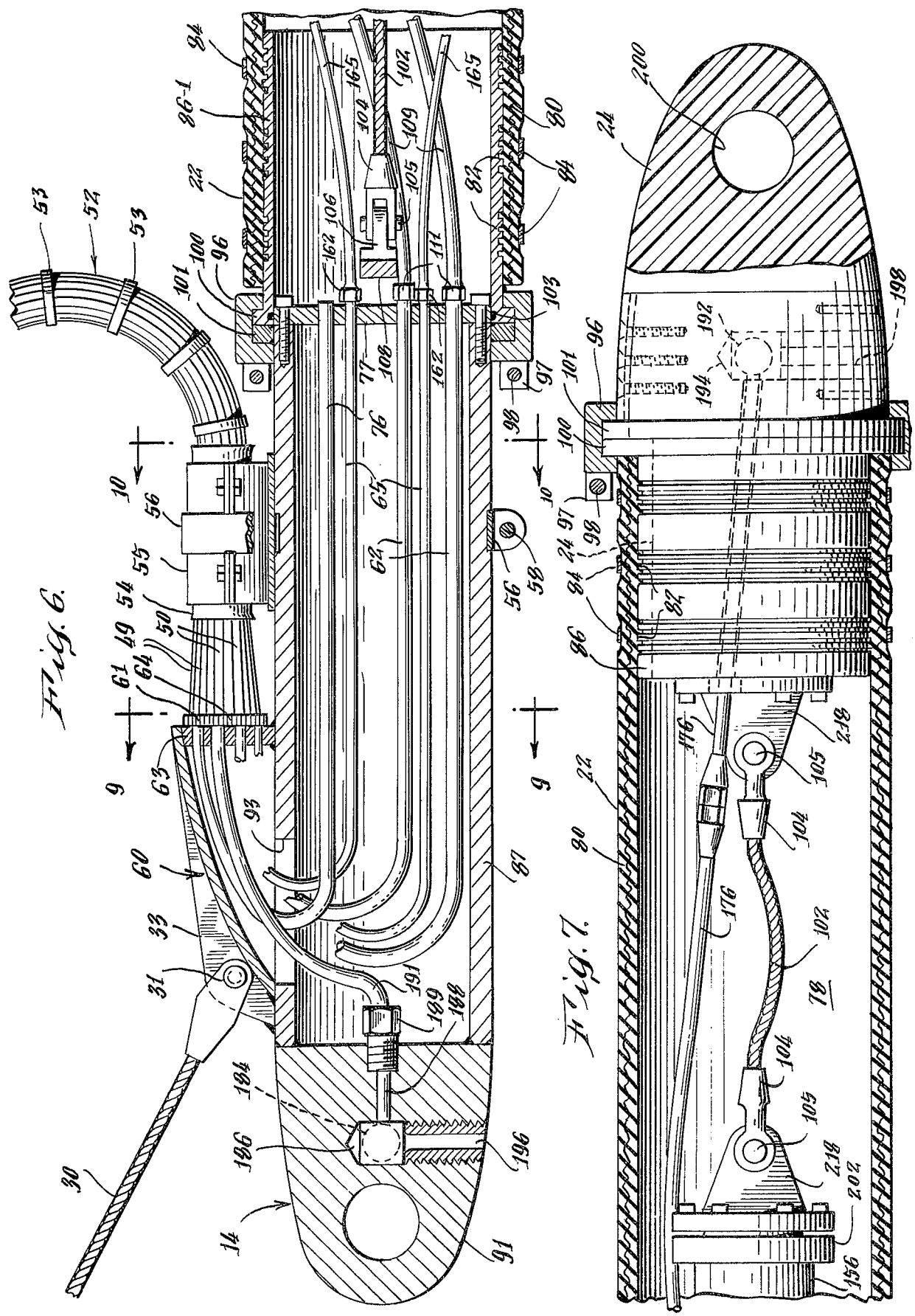

| VOL. IN CU. IN. | SPACERS A | B | C | D | BULK-HEAD | SPACERS A | B | C | D |
|---|---|---|---|---|---|---|---|---|---|
| 30 | | | | | ✓ | ✓ | ✓ | ✓ | ✓ |
| 40 | ✓ | | | | ✓ | | ✓ | ✓ | ✓ |
| 50 | | ✓ | | | ✓ | ✓ | | ✓ | ✓ |
| 60 | ✓ | ✓ | | | ✓ | | | ✓ | ✓ |
| 70 | | | ✓ | | ✓ | ✓ | ✓ | | ✓ |
| 80 | ✓ | | ✓ | | ✓ | | ✓ | | ✓ |
| 90 | | ✓ | ✓ | | ✓ | ✓ | | | ✓ |
| 100 | ✓ | ✓ | ✓ | | ✓ | | | | ✓ |
| 110 | | | | ✓ | ✓ | ✓ | ✓ | ✓ | |
| 120 | ✓ | | | ✓ | ✓ | | ✓ | ✓ | |
| 130 | | ✓ | | ✓ | ✓ | ✓ | | ✓ | |
| 140 | ✓ | ✓ | | ✓ | ✓ | | | ✓ | |
| 150 | | | ✓ | ✓ | ✓ | ✓ | ✓ | | |
| 160 | ✓ | | ✓ | ✓ | ✓ | | ✓ | | |
| 170 | | ✓ | ✓ | ✓ | ✓ | ✓ | | | |
| 180 | ✓ | ✓ | ✓ | ✓ | ✓ | | | | |

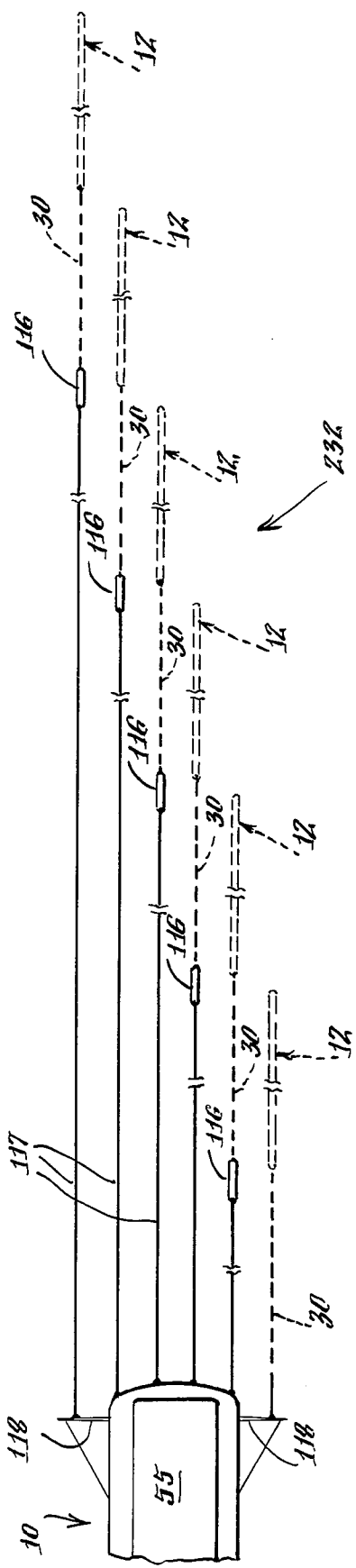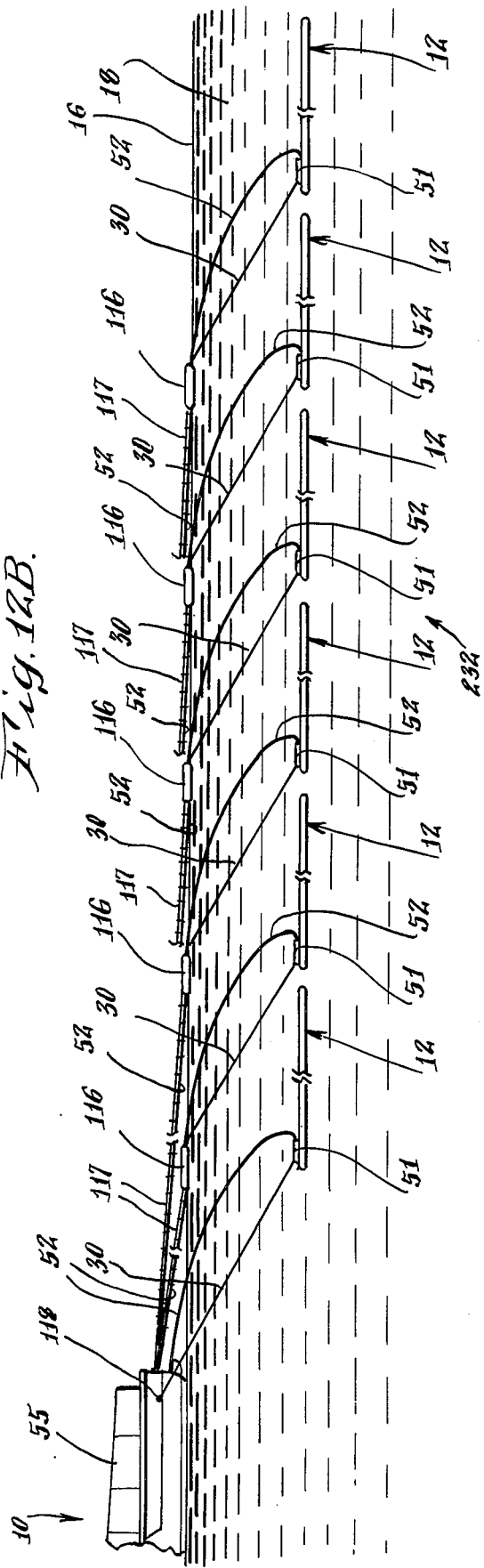
Fig. 12A.
Fig. 12B.

AIRGUN MARINE SEISMIC SURVEY STREAMER METHOD AND APPARATUS

FIELD OF THE INVENTION

The present invention is in the field of marine seismic surveying using non-detonating or non-dynamite seismic energy sources and more particularly relates to methods and apparatus for more effectively and more conveniently employing multiple airguns using compressed air in gathering information about sub-bottom geologic structures and characteristics.

BACKGROUND OF THE INVENTION

The marine airgun and seismic survey methods associated with the marine airgun are described in U.S. Pat. Nos. 3,249,177; 3,379,273; and 3,653,460 of the present inventor. The reader may refer to these patents for background information. Multiple airguns have been used for numerous years by geophysical exploration companies and petroleum companies. It is desired that the multiple airguns all be towed at the same predetermined level below the water surface. This has been accomplished in the past by attaching each individual airgun by a cable to an individual buoy or float, so that when at rest in the water, each airgun hangs suspended on a vertical axis beneath its respective support float. The floats, support cables, and airguns were connected together in an array (including air lines and electrical control lines) which was towed behind the survey vessel, for example, as shown in U.S. Pat. No. 3,893,539 of Lewis M. Mott-Smith. The interconnected floats, airguns, cables, airlines, and electrical lines tend to become snarled and tangled, are awkward to handle in use and are heavy and very difficult to hoist up on board the ship when not in use and again are difficult to launch into the water in unsnarled condition in readiness for use. Another U.S. Pat. which shows each airgun connected by a cable to its individual float is No. 3,437,170 of F.A. Brock and Roy C. Johnston. In this latter disclosure, the first two airguns in the array are suspended from a single float. Because of the awkwardness and difficulties of handling such complex arrays of floats, cables, airguns, air lines and electrical lines at sea under the wave conditions often encountered, there were inevitable snarl-ups and breakages, leading to expensive "down time" for makeshift repairs at sea.

Also, the complex network of multiple floats, support cables, airguns, air supply lines and electrical cables presented a very great drag and turbulence when towed through the water. This drag and turbulence imposed a great stress on the towing gear, leading to breakages and restricting the permissible forward speed of the survey vessel. These difficulties were burdensome to the operating personnel at sea, caused breakdowns, and imposed a practical limit on the numbers of airguns to be simultaneously towed.

The level of the airguns below the water surface was fixed by the length of the cables used to suspend each airgun. If the user desired to change the level of the towed airguns, it was necessary to haul all of the airguns and floats on board the vessel to handle and change the length of each support cable and then to return the whole rig of floats, cables and airguns back into the water. A slight amount of depth control could be obtained in the prior art by changing the speed of the survey vessel, thereby causing the support cables extending from the floats down to the airguns to hang at an angle as a function of the drag of the water which caused the airguns to swing back in the water and to hang at an angle below and behind their respective floats. However, this was only a limited degree of depth control since the speed of the survey vessel was not independent of other parameters and the support cable length was fixed.

For many years, many of these same geophysical exploration companies and petroleum companies have been using a long flexible hydrophone cable often called a "streamer" or a "Paslay streamer," as shown in U.S. Pat. No. 2,465,696. Such streamers contain numerous hydrophones and may extend for a distance of more than one kilometer behind the towing vessel and, when not being used, can be reeled up around a large drum on the vessel. These hydrophone streamers have been made neutrally buoyant, for example, U.S. Pat. No. 2,791,757, issued May 7, 1957, to Francis G. Blake, Glenn A. Schurman and Paul M. Aagaard discloses a neutrally buoyant hydrophone streamer having the same cross section throughout its entire length for causing a minimum of water turbulence as it is towed behind a boat. The buoyancy of this Blake, et at. hydrophone streamer can be changed by means of a small oil-filled resilient tube. The amount of oil in this internal tube can be varied from an amount which stretches the tube to an amount which leaves the tube partially collapsed for varying the overall weight of the hydrophone streamer for making it neutrally buoyant in spite of changes in water density caused by changes in temperature and salinity. Hydrophone streamers are also shown in U.S. Pat. No. 3,378,815 of the present inventor, and U.S. Pat. No. 3,471,827 of Paul Chelminski and the present inventor.

Thus, airguns have been in use since the early 1960's while hydrophone streamers have been used at least since the early 1950's by these same companies for marine seismic surveying. Insofar as I am aware, no one in any of these organizations has suggested that multiple airguns may be handled and towed in a flexible, inflatable, buoyancy-controllable streamer.

SUMMARY OF THE INVENTION

The present invention provides a method and apparatus for simultaneously towing and handling multiple airguns for use in marine seismic surveying. By employing the invention, the user obtains convenience and ease in handling large numbers of airguns. Also, the user is afforded the opportunity of simultaneously towing a greater number of airguns dispersed over a greater horizontal distance in the water than has been considered practicable in the past. This increased number of airguns spaced apart allows the achievement of great peak pressure seismic impulses to be generated in the water with a minimum use of compressed air and provides a maximum flexibility in synthesizing wave shapes. The present invention reduces the towing drag occurring in the water and thus reduces the towing stresses thereby diminishing the likelihood of breakdowns and enabling more airguns to be towed at the same time, if desired.

The method and apparatus of the present invention enable multiple airguns to stream out at a desired depth behind a submerged towing head in a long flexible streamer of controllable buoyancy whose level below the surface can be changed, if desired, while the survey is progressing.

Ten or more airguns can be included in a streamer, if desired by the user, extending for a length of a few meters to a hundred or more meters behind the survey vessel, if desired, for providing an effective geographic diversity in the location of the airguns which can be simultaneously fired or time-delay fired for generating very powerful large area seismic energy wavefronts travelling down through the water. However, whether a longer or shorter airgun streamer is used, there is a significant increase in the ease and convenience of handling and reduction in drag stresses. Moreover, a sequence of these airgun streamers can simultaneously be towed one behind another thus extending over a total distance of one or two kilometers or more behind the survey vessel.

The buoyancy of each airgun streamer is controllable to provide neutral buoyancy during towing, if desired, and a slight positive buoyancy can be created to bring the whole streamer up to the surface in the preparation for taking it on board the towing ship. Each flexible airgun streamer can be conveniently hauled on board by rolling it along a roller conveyor extending over the stern and then later can be rolled back along this conveyor for convenient launching into use with all of the towing stress cables, air lines and electrical control lines incorporated into the streamer so that tangles and snarling in the enclosed cables and lines in the streamer cannot occur. Also, the airgun marine seismic survey streamers can be stored on board with their towing gear by winding them around large drums or by laying them along conveyor channels extending along the perimeter of the survey vessel.

In the preferred streamer construction described, each airgun has a generally cylindrical configuration and is of the same diameter, same length and same weight, but its firing chamber volume can be changed and pre-set to various sizes as may be desired by the user. Each airgun in the streamer is axially aligned with and spaced from the neighboring airguns with interconnecting flexible inflatable sleeves extending between them.

It is also possible to string or submerge one or more airgun streamers embodying the present invention in marshland, swamp or mud areas which are infused with sufficient water that the streamer can be used. Accordingly, the terms "water", or "body of water" and the terms "towing vessel", "ship", as well as "marine seismic surveying", as used in the specification and claims are intended to be interpreted sufficiently broadly to include these marginal applications of the present invention.

BRIEF DESCRIPTION OF THE DRAWINGS

The various aspects, features and advantages of the airgun marine seismic survey streamer method and apparatus of the present invention will be more fully understood from a consideration of the following detailed description in conjunction with the accompanying drawings, in which:

FIG. 1 illustrates a seismic survey vessel under way employing the multiple airgun marine seismic survey streamer method and apparatus of the present invention. For illustrative purposes, the multiple airgun streamer is shown enlarged relative to the towing vessel, and a portion of the control panel and associated appartatus is shown enlarged at the upper right;

FIG. 2 is an enlarged perspective view of a portion of the airgun streamer of FIG. 1, with portions broken away to reveal interior structure;

FIG. 3 is a perspective view of part of the stern of the vessel showing two launch and recovery roller conveyors, with a pair of winches or roll-up and/or storage drums seen at the forward ends of the conveyors;

FIGS. 4A and 4B are to be viewed with FIG. 4A placed immediately to the left of FIG. 4B. Considered together as one drawing, these two FIGS. show an axial sectional view of a portion of the airgun streamer including one of the airguns and one of the flexible inflatable sleeves connecting the rear end of this one airgun to the front end of the next airgun;

FIG. 5 is a cross-sectional view of FIG. 4A taken along the line 5—5 of FIG. 4A;

FIG. 6 is an axial sectional view of the towing head of the streamer and the flexible, inflatable sleeve extending from the rear end of the towing head;

FIG. 7 is an axial sectional view of the tail plug and adjacent portions of the streamer;

FIGS. 12A and 12B are plan and elevational views, respectively, of multiple airgun streamers being towed behind a single survey vessel extending over a great distance behind the vessel.

DETAILED DESCRIPTION

Figures 8, 11:
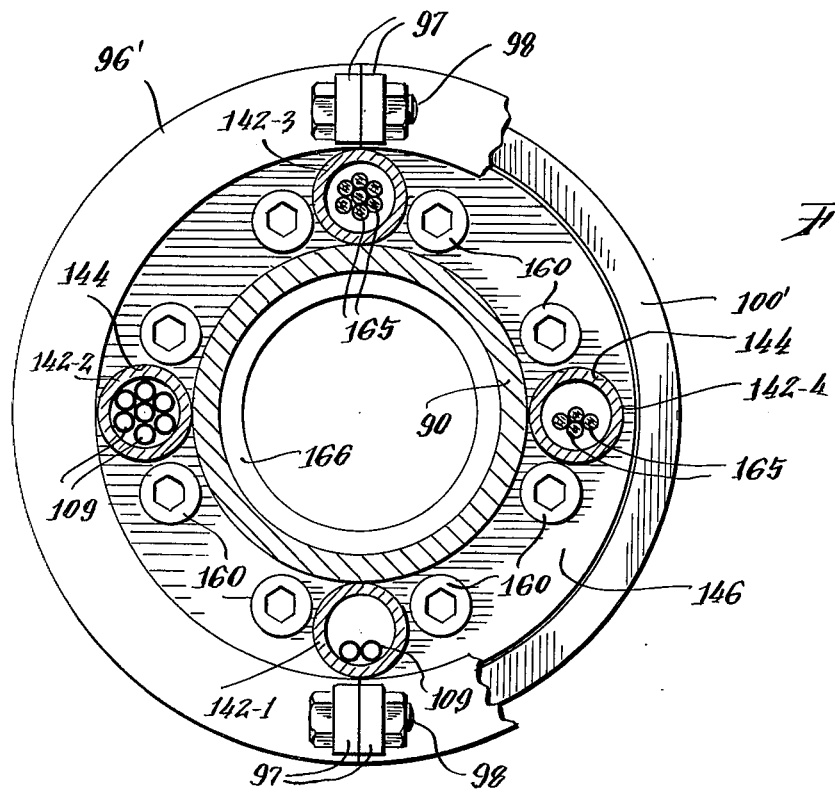
FIG. 8 is a chart showing how the volumes of the firing chambers of the respective airguns in the streamer can be changed while allowing the overall weight of each airgun to remain the same.
FIG. 11 is a cross-sectional view through one of the airguns taken along the line 11—11 in FIG. 4A.

As shown in FIG. 1, a survey vessel 10 is towing a multiple airgun marine seismic survey streamer 12 which embodies the apparatus and employs the method of the present invention. As shown, the streamer 12 is inflated to its neutrally buoyant condition. Thus, the streamer 12 trails horizontally behind its towing head 14 so that it extends at a uniform distance below the surface 16 of the body of water 18. The airgun streamer 12 includes a plurality of generally cylindrical airguns 20 positioned in spaced end-to-end relationship with a flexible, inflatable sleeve 22 extending between and interconnecting each of the airguns. There is also a flexible sleeve 22 interconnecting the towing head 14 and the first airgun 20 and a similar sleeve interconnecting the last airgun 20 and the tail plug 24.

It is to be understood that the streamer 12 may have any desired length from several meters up to one or two hundred meters or more. Furthermore, as shown in FIGS. 12A and 12B, a sequence of these streamers can be towed extending over a total distance of one or two kilometers or more. There may be included only 2 or 3 airguns 20, if desired, by the user. However, such a streamer 12 as described herein may include 30, 40, 50 or more airguns because this streamer provides convenience and ease in handling large numbers of airguns. This invention enhances the ability of the crew to handle multiple airguns in a string when being towed behind a survey vessel during operation and when being loaded on or being off-loaded in finishing or commencing a survey operation.

Moreover, the elongated overall configuration of the towed streamer and its controllable towing characteristics, as will be explained, minimize the towing stress being imposed on the streamer to facilitate the simultaneous towing of relatively large numbers of airguns. Thus, relatively large amounts of seismic energy can be emitted into the water at a plurality of spaced points to produce composite acoustical waves of deep penetration capability and yielding high resolution in the information obtained about the subbottom strata and formations and giving good signal-to-noise characteristics, as desired in this art. The user is hereby afforded the opportunity of simultaneously towing a much larger number of airguns spread along a much greater horizontal distance in the water 18 than the user previously has done.

Powerful seismic energy waves of deep penetration capability are generated in the water by the sudden and abrupt release into the water of compressed air or high pressure gas which is discharged simultaneously from the multiple airguns 20 or with time delay between the firing of the respective airguns. The resulting powerful composite seismic energy waves which are created in the water by the combination of the effects of all of the individual airguns occurring at a distance below the streamer in the "far field" region have a desirable long horizontal wavefront configuration in the fore and aft direction parallel with the longitudinal axis of the streamer 12 for travelling down through the water and into the bottom material down into the various sub-bottom strata and geological formation to reveal information about them. The airguns 12 are all simultaneously or time-delay fired at frequent intervals as the survey craft 10 proceeds along a prescribed course.

A winch 26 at a convenient location, well forward of the stern 28 of the vessel 10, is attached to a towing cable 30 which is secured by a pivot connection 31 (FIG. 6) to the towing head 14 of the streamer. The towing cable 30 extends aft from the winch 26 along a roller conveyor 32 (see also FIG. 3) which may be used to facilitate the launching and recovery of the airgun streamer 12. The winch 26 may be in the form of a large storage drum around which the streamer can be wound. If desired, the roller conveyor channel 32 can be extended along a major portion of the perimeter of the survey vessel for conveniently storing on board a number of the long airgun streamers when not in use. Very little headroom is required for such a storage conveyor, and so it can be located in a dropped ceiling space positioned immediately below a deck and extending along substantially the full length of the deck. It is among the advantages of employing the present invention that it enables such convenient launch, recovery and storage gear 26, 32 and 38 to be used.

FIG. 3 shows that the boat may be equipped with two or more such conveyors 32 and 32' spaced apart in parallel with a walkway 34 positioned between them for operating personnel to walk along for inspecting and servicing the airgun streamer as it lies extended along the conveyor trough. The two conveyors are provided for simultaneously towing two or more of the airgun streamers parallel to each other. The conveyors have smooth inwardly sloping side walls 36 defining a trough with the rollers 37 extending transversely across the bottom of the trough. Each conveyor trough 32 and 32' is aligned with respective winches 26 and 26'. The aft end 38 of each conveyor projects beyond the stern trasom 28 and curves down close to the surface 16 of the body of water 18.

The survey vessel 10 is equipped with an air power supply 40 which includes one or more high pressure air compressors each usually driven by a large diesel engine with a receiver tank for temporarily storing the high pressure compressed air. This high pressure air is usually at a pressure of approximately 2,000 pounds per square inch (p.s.i.) to 2,500 p.s.i., but greater or lesser air pressures may be used as desired by the survey team.

From the air power supply 40, the compressed air passes through suitable filter and moisture separator means 42 and through a shut-off valve 44. This high pressure air is supplied into the firing chambers in the respective airguns 20 and is suddenly released through their discharge ports 45 in response to an electrical control signal for generating the seismic energy pressure waves in the water 18.

In order to supply this high pressure air to the respective airguns, it is fed through a high pressure line 46 into a manifold 47 connected through a plurality of individual shut-off valves 48 and then through individual flexible high pressure hose lines 49 extending down to the towing head 14. Th valves 48 enable the high pressure air to be shut off from any one of the hose lines 49. These hose lines 49 individually supply air to the respective airguns in the streamer 12.

When a number of airgun streamers 12 are being towed as shown in FIGS. 12A and 12B, then there is a high pressure air supply manifold 47 with its associated shut-off valves 48 in use for each of the streamers. Thus, the air can be shut off from any given one of the airguns in case it malfunctions without affecting the operation of all of the others.

The hose lines 49 extending to any given towing head 14 are all bundled together with the electrical control lines 50 extending to that towing head to form a bundle 52 as shown more clearly in FIG. 6. This bundle 52 of high pressure air supply lines and electrical lines may be protected by winding with tape 53 or by a shrunk-fit jacket. It is mounted onto the towing head by a flexible tube section 54 held by a clamp 55 secured by a clamping strap 56 and tightening bolt 58.

Figure 9:
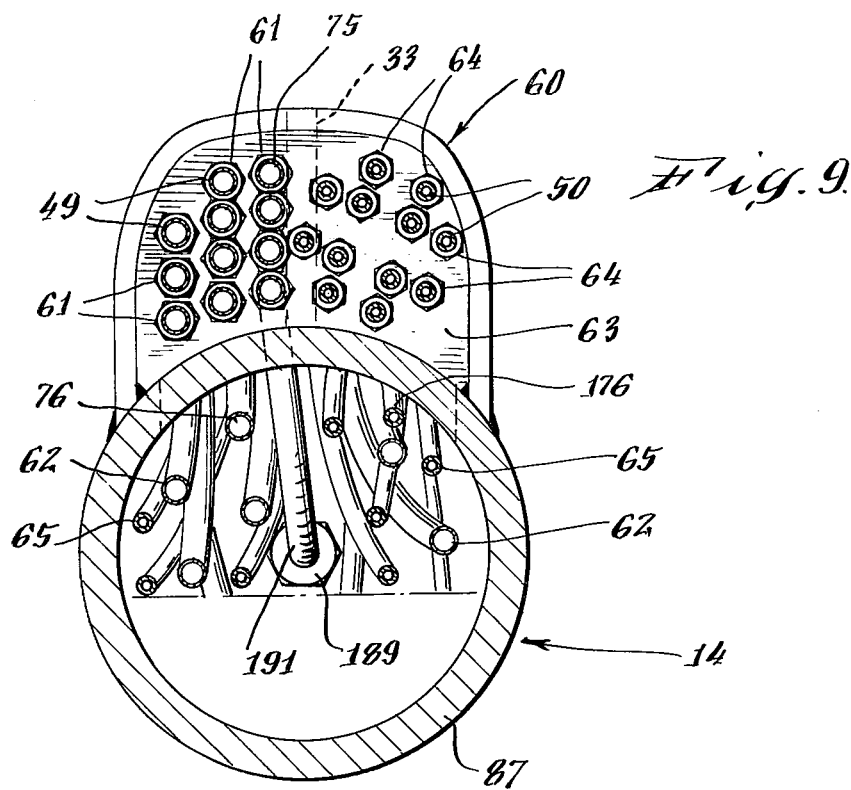
FIG. 9 is a cross-sectional view taken along the line 9—9 in FIG. 6 showing multiple air line and multiple electrical line connections.
Figure 10:
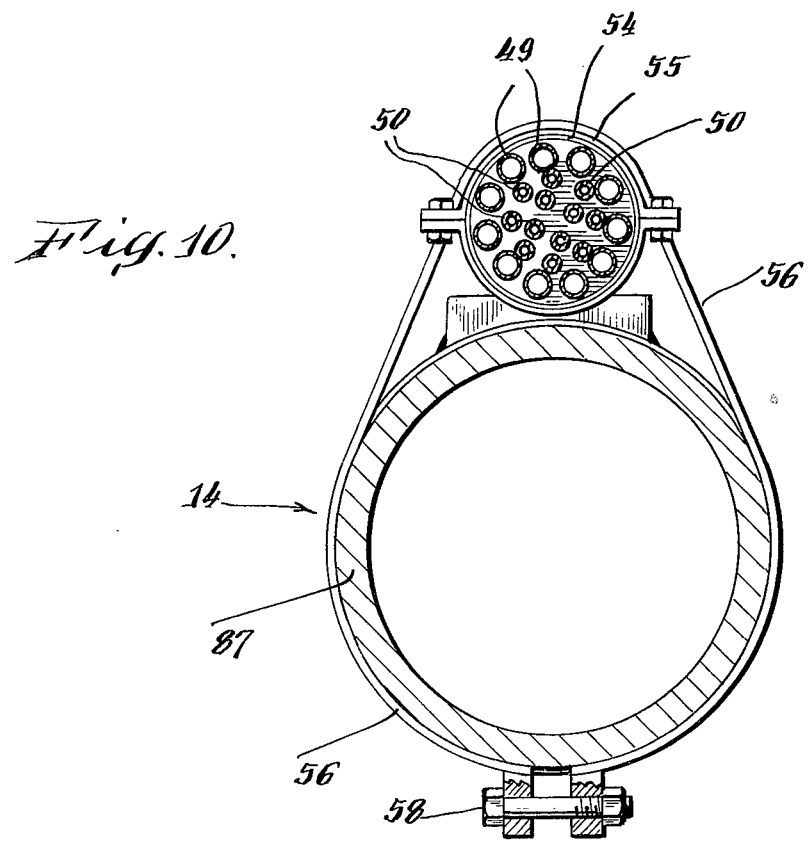
FIG. 10 is another cross-sectional view taken along the line 10—10 in FIG. 6 showing mounting apparatus for the bundle of air lines and electrical lines.

As seen in FIG. 6, there is a streamlined junction box 60 located on the top of the towing head 14 behind the towing cable mount 33. The individual high pressure hose lines 49 are each removably attached by waterproof hose couplings 61 (see also FIG. 9) to screw threaded fittings on the ends of small high pressure air feed lines 62. These screw threaded fittings are held rigidly in position by a bulkhead 63 at the rear of this junction box 60 for convenient access in attaching the respective couplings 61. As shown in FIG. 6, the pipe lines 62 curve down from the junction box and extend into the hollow towing head 14 for supplying air to the respective airguns as will be explained in detail further below.

Similarly, the individual electricail control lines 50 are removably attached by waterproof marine pin connectors 64 to respective electrical control lines 65 extending down into the towing head. These detachable electrical connectors 64 are secured by screw type watertight couplings located at the bulkhead 63. The way in which the control lines 65 are connected to the individual airguns in the streamer 12 will be explained in detail further below.

In order to control the towing depth and buoyancy of the airgun streamer 12, the survey vessel 10 is equipped with a control panel 25 and a low pressure compressed air supply 66, for example, having a pressure in the range from 100 to 250 p.s.i. The control panel 25 is shown enlarged at the upper right in FIG. 1, but it actually is located in a suitable position on the ship 10, for example, such as in a recording room 67 near the stern. The low pressure air may be supplied by a separate small compressor, if desired; however, a convenient way to obtain this low pressure air is shown in FIG. 1. A branch line 68 runs from the shut-off valve 44 through a shut-off valve 69 into a pressure regulator 70 having two pressure gages 71 and 72.

The gage 71 shows the pressure of the high pressure air, while the gage 72 shows that of the low pressure air being produced by the regulator. A control handle 73 is turned for changing the regulated pressure of the low pressure air. This low pressure air is passed through a vent valve 74 into a flexible hose line 75 extending down within the bundle 52 (FIG. 6) to the towing head 14. The flexible hose line 75 is connected by one of the hose couplings 61 at the junction box 60 to a pipe line 76 which extends down into the towing head and runs back to a bulkhead 77. This pipe line 76 opens through the aft side of the bulkhead 77 for feeding the low pressure air back into an inflatable buoyancy chamber 78 located within the first flexible sleeve 22 of the airgun streamer.

This flexible sleeve 22 is illustratively shown as being fabricated from a convenient large diameter rubber hose line having an internal diameter of 8 inches and being strengthened by plies of reinforcing strands 80, for example, of braided fine steel wires, woven fabrics, or the like, embedded within the rubber wall of the sleeve 22. It is my present preference to use flexible rubber sleeves 22 which are reinforced by multiple layers of steel strands 80 in the regions near the airguns to stiffen the sleeve 22 for resisting the pressure pulses occurring when the airguns are fired.

In order to removably attach the sleeve 22 onto the aft end of the towing head 14 (FIG. 6), there are three groups of closely spaced circumferential grooves 82 around a removable sleeve connector barrel 86-1 encircling this end of the towing head with three metal clamping straps 84 around the front end of the sleeve 22 overlying these groups of grooves. This sleeve connector barrel 86-1 has a flange 100 at its front end which abuts against a mating flange 101 formed by a ring welded onto the metal wall 87 of the towing head, and a removable clamp ring 96 holds the two flange 100 and 101 together. This clamp ring 96 is made in two semicircular halves held together by lugs and bolts as will be shown and described in detail for other similar rings, and thus the connector barrel 86-1 can be slid off of the towing head when the clamp ring 96 is removed. An O-ring 103 in a groove at the towing head seals the joint between the interior surface of the removable connector barrel 86-1 and the exterior surface of the cylindrical wall 87 of the towing head. Thus, an airtight and watertight joint of high mechanical strength is provided between the sleeve 22 and the towing head.

The various sleeves 22 of the streamer 12 are similarly removably but tightly attached as shown in FIGS. 4A and 4B by means of grooves 82 and clamping straps 84 to connectors 86 on the fore and aft ends of the respective airguns 20 as will be explained below.

The towing head (FIG. 6) has a streamlined nose and is made of heavy material, such as steel or stainless steel pipe or the like, welded to the nose 91. A cut out 93 is made in the top of the wall 87 within the housing of the junction box 60 which is welded onto this wall around the cut out region. This cut out provides clearance for the high pressure air lines 62, low pressure air line 76 and electrical control lines 65 to enter the towing head.

The pivot connection 31 between the clevis on the towing cable 30 and the mounting eye 33 takes the towing pull, while the bundle 52 of air hoses and electrical cables is slack, as indicated in FIGS. 1 and 6. The clamp 55 serves to anchor this bundle onto the towing head.

The flexible sleeve 22 (FIG. 6) extends back from the towing head and is secured to a sleeve connector barrel 86 extending forward beyond the front end of the first airgun 20, for example as shown in FIG. 4A. This sleeve connector 86, in turn, is secured to an inner ring head 88 which is attached by a circle of machine screws 89 (only one is seen in FIG. 4A) to the main housing cylinder 90. To mate with the inner ring head 88, the inner surface of the cylindrical wall of the sleeve connector 86 is machined out to form a socket 92 with an internal shoulder 94 at the front end of this socket.

The sleeve connector barrel 86 cannot slide backwards relative to the ring head 88 because its shoulder 94 abuts the forward rim of this ring head. Conversely, it cannot slide forward relative to the ring head 88 because of a clamp ring 96. This clamp ring is made in two semi-circular halves connected by lugs 97 and bolts 98 and embraces a flange 100 on the sleeve connector as well as abutting the rear end of the ring head 88.

When the clamp ring 96 is removed, the sleeve connector 86 can be slid forward off from the inner ring head 88 for exposing the interior of the buoyancy chamber 78.

In order to carry the towing stress, an emergency stress member in the form of a flexible cable 102, as shown in FIGS. 6 and 4A, may be provided, if desired, extending from the towing head to the airgun. When multiple layers of steel reinforcing strands 80 extending the full length of each sleeve 22 are used, then the stress cable 102 may be omitted. The front end of this cable 102 is attached by a clevis 104 and removable pin 105 to an eye 106 welded to a transverse strut 108 attached to the sleeve connector barrel 86-1 which is clamped onto the back end of the towing head. The rear end of this cable 102 (FIG. 4A) is attached by a similar clevis 104 and pin 105 to a transversely extending strut 112 whose opposite ends are welded to the interior of the sleeve connector 86 which is clamped onto the front end of the airgun. A notch at the center of the rear edge of the strut 112 keeps the clevis centered on this strut.

The manner is which the high pressure air is supplied to the respective airguns 20 will now be described. As mentioned previously, the multiple air-feed pipe lines 62 (FIG. 6) extend aft in the towing head 14 and are connected through the bulkhead 77 to a plurality of screw threaded hose fitting nipples (not seen) located at the rear face of this bulkhead 77.

A plurality of flexible high pressure hose lines 109 (FIG. 6) are detachably connected by hose fittings 111 onto these nipples, so that the high pressure air feeds into each of these hose lines 109 which extend back through the semiinflatable chamber 78 to the first airgun (FIG. 4A). An individual one of these air lines 109 separates from the group of these lines and is removably secured by a suitable detachable hose coupling 120 to a threaded nipple 122 leading into a passage 123 passing through a transversely extending wall 124 of the inner ring head 88. This passage 123 communicates directly with another passage 126 leading into the control chamber 128 of the airgun 20 for supplying high pressure air thereto.

The high pressure air flows from the control chamber 128 through an axial passage (not shown) in a shuttle member 130 leading into the firing chamber 132 of the airgun. Thus, the firing chamber 132 becomes fully charged with high pressure air. If the reader desired to have more information about the construction and operation of shuttles in airguns, attention is invited to U.S. Pat. Nos. 3,249,177; 3,379,273 and 3,653,460, mentioned above, and to U.S. Pat. No. 3,707,848.

When it is time to fire the airguns 20, an electrical control signal is fed to a solenoid control valve 134 which thereupon permits high pressure air to travel from the control chamber 128 through a trigger passage 136 causing the shuttle 130 to accelerate to the left in FIG. 4A for abruptly releasing the charge of high pressure air from the firing chamber 132 to blast out through four discharge ports 45, which are also seen in FIG. 5. The way in which the electrical control singal is supplied to the respective selenoid valves 134 of the airguns 20 will be described further below.

In tracing the supply of high pressure air to the other airguns, it is seen in FIG. 4A that a group of high pressure air hoses 109 extends through a port 140 in the transverse wall 124 of the inner ring head 88. This port 140 communicates with a socket 141 in the transverse wall 124 in which is seated the forward end of a rigid metal pipe 142-1 extending in an axial direction along the exterior of the airgun 20. The back end of this pipe 142-1 passes through a hole 144 in a flange 146 located at the rear end of the main cylinder housing 90. As shown in FIG. 5, the rigid metal line 142-1 is positioned to be adjacent to the exterior of the main cylinder housing 90 in the region between neighboring discharge ports 45.

There are four of these rigid metal pipe lines 142-1, 142-2, 142-3 and 142-4 (FIG. 5) which are similarly located between neighboring discharge ports 45 and are held on place by a rugged bracket ring member 148 to resist the tremendous momentary forces involved during the abrupt discharge of high pressure air through the discharge ports. This rugged bracket member 148 has pairs of projecting lugs 150 which straddle each of these four rigid pipe sections 142.

The foreward ends of each of these four rigid pipeline sections 142-1, 142-2, 142-3 and 142-4 fit into respective ones of four identical equally circumferentially spaced sockets 141 in the rear face of the transverse wall member 124. The rear ends of each of these four pipeline sections pass through respective ones of four identical equally circumferentially spaced holes 144 in the flanges 146 of the main cylinder housing 90, and these rear ends each seat into a respective one of four equally circumferentially spaced sockets 152 formed in the front of the flange 154 of the firing chamber cylinder housing 156. The holes 144 are each aligned with one of the sockets 152. O-rings 155 (FIG. 4A) surround the front and rear ends of each rigid pipe section 142-1, 142-2, 142-3 and 142-4 within the sockets 141 and 152 for making watertight and airtight connections with these eight sockets. Also, there are four ports or holes 140 in the transverse wall member 124 which are aligned with and communicate with the respective sockets 141. There are four passages 158 in the rear portion of flange 154 which are aligned with and communicate respectively with the four sockets 152 in the front portion of this flange. Thus, there are provided four watertight tubular lines 142-1 to 142-4 which bypass each airgun and extend between each successive pair of buoyancy chambers 78.

As mentioned above, a group of high pressure hose lines 109 pass through one of the ports 140 into watertight tubular passage 142-1, and another group of these hose lines 109 pass through another one of the ports 140 into another watertight tubular passage 142-2.

In FIG. 5, these groups of air lines 109 can be seen passing through the tubular passages 142-1 and 142-2, thereby reaching two of the passages 158 (FIG. 4A) leading into the next buoyancy chamber 78 located to the rear of the first airgun. The next buoyancy chamber 78 can be more fully seen in FIG. 4B, and it is seen that the high pressure hose lines continue back through this chamber 78 to the second airgun 20 (which is partially seen at the right in FIG. 4B). An individual one of these hose lines 109 separates from the rest and is connected by a detachable hose coupling 120 to a nipple leading into the second airgun.

The rest of the air lines 109 pass through a pair of the tubular bypass passages 142 associated with the second airgun 20, so that they can extend back to the third airgun. At the third airgun, another one of the hose lines 109 is connected to the airgun by a detachable hose coupling, such as shown at 120 in FIG. 4B, ans so forth all the way back along the airgun streamer. In this way, the high pressure air is supplied to all of the airguns in the streamer. The flexible high pressure hose lines 109 extending through the respective buoyancy chambers 78 permit the sleeves 22 to flex without damage to these hose lines or to the sleeves. Also, the sleeves 22 and the rigid tubular bypass passages 142 protect the individual air lines from damage.

The manner in which one of the flexible sleeves 22 is attached to the aft end of the airgun 20 is shown in FIG. 4A. The rear end of the airgun is equipped with a rear sleeve connector barrel 86' which mates with and encircles the flange 154 of the firing chamber cylinder housing 156. This rear sleeve connector 86' is machined out to form a socket 92' with an internal shoulder 94' abutting against the rear of the flange 154. The forward end of this connector 86' has a flange 100' secured by a clamp ring 96' similar to the clamp ring 96 for the flange 100. This clamp ring 96' abuts agains the forward side of the flange 146 on the main cylinder housing 90 thereby securing the sleeve 22 onto the airgun near the region where the flanges 146 and 154 abut against each other.

When the clamp ring 96' (FIGS. 4A and 11) is removed, it allows the rear sleeve connector 86' to slide rearward off of the flange 146 and 154 and also disconnects these abutting flanges 146 and 154 to permit the airgun to be separated at the junction between these flanges, i.e. at the juncture between the main cylinder housing 90 and the firing chamber cylinder housing 156. There is also a circle of eight machine screws 160 (seen in FIG. 11) which secures the main cylinder housing 90 to the firing chamber cylinder housing 156. These machine screws 160 must be removed to permit separation of these two housings.

In order to hold the shuttle 130 and its associated assembly 164 (FIG. 4A) in place between the control chamber 128 and the firing chamber 132, the firing chamber cylinder housing 156 has an inwardly extending annular lip 166 which projects forward into the rear end of the main cylinder housing 90 and abuts against the shuttle assembly 164. Thus, when the housings 90 and 146 are separated at the juncture between their flanges 146 and 154, the shuttle assembly 164 becomes freed to be withdrawn from the main cylinder housing 90.

In order to feed the electrical firing signals to the respective solenoid control valves 134 of the various airgun 20, there are the plurality of electrical control cables 50 (FIG. 6) mentioned above, which extend down in the bundle 52 from the ship 10. In the recording and control station 67 on the ship, there is an airgun firing control circuit, as well known in the art. The firing control circuit enables all of the airguns 20 in one or more of the streamers 12 to be fired simultaneously or to be fired with time delays between firing of the various airguns. This firing control circuit is connected to the respective control lines 50 which, in turn, are coupled at the junction box 60 (FIG. 6) to the respective electrical lines 65 within the towing head.

In order to connect with the respective solenoid control valves 134, these electrical lines 65 (FIG. 6) extend through the bulkhead 77 to individual electrical connectors 162 at the rear face of this bulkhead. Within the buoyancy chambers 78, there are a plurality of electrical control lines 165 attached by the connectors 162 to the lines 65. These lines 165 extend back to the first airgun 20 (FIG. 4A). One of these control lines 165 is connected to the first solenoid control valve 134 while the rest of them extend through two of the ports 140 and back through the two watertight tubular bypass passages 142-3 and 142-4, as shown in FIG. 5. These electric lines 165 continue back through two of the passages 158 (FIG. 4A) into the second buoyancy control chamber 78. One of these control lines 165 is connected to the second solenoid control valve 134 while the rest continue back through the next two bypass passages 142, and so forth. As it is desired to have the capability of firing each of the airguns individually, the control lines 165 are equal in number to the number of airguns in the streamer plus a few spare control lines, plus electrical circuit wiring 176 (FIG. 7) for a depth sensor in the tail plug 24, as will be explained further below.

The rigid pipeline section 142-3 and 142-4 (FIGS. 4A and 5) serve as conduits for protectively carrying the electric lines from one of the buoyancy chambers 78 into the next buoyancy chamber and also the flexible sleeves 22 protect these electrical lines.

The manner in which the internal pressure within all of the buoyancy chambers is equalized will now be explained. There is clearance space as seen in FIG. 5 around the air and electrical lines 109 and 165 within the four tubular bypass passages 142 which serve to interconnect successive buoyancy chambers 78. In other words, the low pressure air which is supplied through the towing head passage 76 (FIG. 6) into the first buoyancy chamber 78 can flow freely back into all of the other buoyancy chambers until the inflation pressure in the respective sleeves 22 is equalized throughout the whole streamer 12.

Although the airgun streamer 12 has been described as having a separate high pressure air supply line 109 for each of the airguns 20, it is to be understood that other arrangements can readily be used. For example, each line 109 can be connected to a pair of airguns. This paired supply connection is accomplished by putting a Tee hose fitting in the airline near the first airgun of the pair of provide a branch line which is connected at 120 (FIG. 4A) into the first airgun. Then the branch of the Tee connection serves to feed a hose line running to the second airgun of the pair.

Similarly, each hose line 109 can serve to feed three or more airguns by using an appropriate number of Tee-connection hose fitting, with the diameter of the hose line being increased somewhat to provide additional air flow capacity.

For sensing the actual depth of the towing head 14, there is a pressure responsive transducer unit 184 (FIG. 6) mounted in a cavity 186 in the head 14 and connected by an electric circuit 188 and coupling 189 and line 191 extending up through the junction box 60 to a control cable 193 extending up in the bundle 52 to a depth indicator 190 (FIG. 1) in the control panel located on shipboard in the operating station 67. There is another depth sensor 192 (FIG. 7) located in a cavity 194 in the neutrally buoyant plastic tail plug 24 which plugs the tail end of the last buoyancy chamber 78. An electric circuit 176 extends from the rear sensor 192 through the buoyancy chambers 78 and through the bypass tubular passages 142 to a connector 162 at the towing head and thence to the junction box 60 and through another connector to an electric cable 195 in the bundle 52 extending up to another depth indicator 196 (FIG. 1). The cavities 186 and 194 communicate through inlets 196 and 198, respectively, with the body of water 18 surrounding the airgun streamer.

When operating with multiple airgun streamers, as shown in FIGS. 12A and 12B, there is used a control panel and associated apparatus for each streamer for depth control.

An eye opening 200 in the streamlined aft end of the tail plug 24 may be used to aid in launching the streamer 12. Also, a length of heavy rope (not shown) may be spliced into this eye 200 to trail in the water behind the streamer as a damping agent for damping any lateral snakelike or fishtail movement of the streamer, in the manner that a tail on a kite tends to damp its lateral movement. The frictional drag of this rope tail exerts a steadying rearward pull on the tail plug 24.

When placing the towed airgun streamer 12 into use, the survey crew first prepares all of the airguns 20 for operation. Next the buoyancy chambers 78 are filled to a pressure, for example of 150 to/200 p.s.i. by adjusting the output of the pressure regulator 70, as shown on the gage 72. The low pressure line bleed valve 74 remains closed at this time and the line shut-off valve 69 is opened. Thus, the streamer becomes filled with air at the regulated pressure, which has been predetermined to be slightly more than enough to float the entire streamer, i.e. to provide a slight positive buoyancy. The streamer 12 is rolled back along the roller conveyor 32 by backing off the winch 26 to allow the streamer to roll down over the descending conveyor extension 38 into the water near the stern of the vessel. During this time the survey craft 10 is underway, slowly proceeding forward. After the towed streamer 12 is entirely over the stern of the vessel, the heavy towing head 14 is held by the cable 30 just touching the water with the remainder of the towed streamer supporting the airguns and floating along the surface behind the vessel by virtue of the slight positive buoyancy therein.

In order to bring the towed streamer 12 down to the desired towing depth, the bleed valve 74 is now opened slightly. Thus, as the low pressure air bleeds out of the towed streamer up through the air line 75, the pressure regulator 70 is adjusted to a lower pressure until the streamer 12 just starts to sink. At this point, the adjustment of the regulator 70 is set at the pressure which causes the towed streamer 12 to just barely sink, for example 50 to 100 p.s.i.

The towed airgun streamer now being slightly negatively buoyant may be lowered when desired by paying out the tow cable 30 as the vessel 10 still moves ahead slowly. This towing cable along with the bundle 52 of lines 49, 50 75, 193, 195 is payed out until the depth indicator 190 on the control panel 54 indicates that the head 14 is located at the proper depth. The towing cable 30 is now made fast and the ship is brought up to the desired towing speed.

If the towing head 14 rises because of the increased speed of the ship, more towing cable 30 may be payed out to bring it back to the proper towing depth as shown by this gage 190. At this time, the tail of the streamer may now be advantageously raised or lowered to match the depth of the towing head 14 by raising or lowering the buoyancy air pressure within the sleeves 22. The control of vehicle depth is done by adjusting the air pressure regulator 70 and the bleed valve 74. Thus, by adjusting the depth of the towing head 14 by shortening or lengthening the towing cable 30 and by adjusting the depth of the tail end of the towed through small changes in buoyancy, the whole streamer is controlled as to the towing depth.

During the survey operation, if desired, it is possible to change the level at which the airgun streamer is being towed by using the winch 26 to change the length of the towing cable and by making appropriate small changes in streamer buoyancy as determined by comparing the rear depth gage 196 with the front depth gage 190.

The streamer is conveniently hauled on board the ship by slowing the ship's forward speed, then hauling up on the towing cable 30 while increasing the buoyancy of the streamer until it is just barely floating with a slight positive buoyancy. At this point, the towing head is above the surface and the whole streamer 12 is visible to the crew as it extends back along the surface 16 behind the now slowly progressing ship. The cable 30 is used to haul the towing head up onto th conveyor extension 38 and then forward along the conveyor 32. By virtue of the fact that the streamer is floating, the crew's job is facilitated to haul it up along the conveyor extension 38 by pulling with the winch 26. There is no complex network of support cables, individual floats, individual ariguns and control cables to become snarled. Therefore, the screw's job is made easier and more efficient, and a larger percentage of the available time can be used for performing the actual seismic surveying work.

In order that all of the airguns may have the same size, weight and diameter, but different pre-settable firing chamber volumes, the firing chamber cylinder housing 156 has a retainer flange 202 (FIG. 4B) at the rear, and a circle of machine screws 204 (only one is seen in FIG. 4B) serves to secure a retainer plate 206 across the rear of this housing 156. Within this housing 156 are a series of four removable cylindrical spacers A, B, C and D of differing lengths plus a removable bulkhead 208.

This arrangement enables sixteen different firing chamber volumes to be obtained by placing different combinations of the spacers A, B, C and D before and after the movable bulkhead, which is held in place by these spacers and by the retainer plate 206. FIG. 8 is a chart showing as an example that firing chamber volumes from 30 cubic inches up to 180 cubic inches can be obtained in increments of 10 cubic inches. For example, if the internal diameter of the firing chamber 210 is 3.5 inches as defined by the I.D. of these cylindrical spacers, then utilizing four spacers having the respective axial lengths, as shown in the following Table, enables the results of FIG. 8 to be obtained.

TABLE I

| Spacer | Axial Length in Inches |
| --- | --- |
| A | 1-1/16 |
| B | 2-3/32 |
| C | 4-3/16 |
| D | 8-5/16 |

All of the spacers are always present along with the bulkhead 208, and thus the retainer 206 can always hold them securely in place and the total airgun weight remains the same. FIG. 4B shows the largest possible firing chamber volume with all of the spacers located in front of the bulkhead 208.

A threaded nut 212 is welded onto the rear of this movable bulkhead 208 to facilitate extraction of the bulkhead from within the housing 156. A threaded rod can be manually screwed into this nut 212 and then be used as a convenient extraction tool whenever it is desired to re-arrange the spacers and the bulkhead to change the volume of the firing chamber 210. An O-ring 214 in a groove encircles the perimeter of the bulkhead to prevent leakage from the firing chamber. The outer edges of the spacers A, B, C and D are chamfered, for example, as indicated at 211, to facilitate their insertion into the cylinder housing 156.

There is a cut out region 216 in the retainer 206 to provide clearance for the threaded socket 212 when the bulkhead 208 is located at its rearmost position, as shown in FIG. 4B. An attachment eye 218 is welded onto the retainer plate 206 for fastening the stress cable 102 to the rear of the airgun.

The slack in the electrical cables 165 and air lines 109, as shown in FIG. 4B, enables the streamer 12 to be disassembled for internal inspection or replacement of parts by removing the clamps 96 and 96' without also disconnecting the electrical cables or air lines. Slack in the emergency stress cable 102 is also provided to enable this disassembly.

As shown in FIGS. 4A and 4B, there are other O-rings provided to prevent leakage at various connection joints. For sealing the joint between the sleeve connector 86 and the linner ring head 88, there is an O-ring 220 in a groove in the ring head 88. To seal the joint between the transverse head wall 124 and the front end of the main cylinder housing 90, there is an O-ring 224 in a groove encircling the projecting end of the housing 90. This inner ring head 88 serves to hold the solenoid valve in place by having a central aperture 226 in its transverse head wall 124 which engages a flange on the solenoid as shown in FIGS. 4A and 4B.

The inner forward lip 166 (FIG. 4A) of the firing chamber cylinder housing 156 is sealed to the inner surface of the main cylinder housing by an O-ring 228 in a groove encircling this lip.

In order to disassemble an airgun 20, the two clamp rings 96 and 96' are removed. Then the sleeve connectors 86 and 86' are slid forward and backward, respectively, off of the inner head ring 88 and off of the flanges 146, 154. The circle of eight bolts 160 (FIG. 11) which connect the main cylinder housing 90 to the firing chamber cylinder housing 156 is removed. Then the firing chamber lip 166 can be separated from the main cylinder housing 90 to expose the shuttle assembly 164 and associated parts.

In order to remove the main working parts of the airgun from the streamer 12, an adjacent two of the rigid pipes, e.g. pipes 142-2 and 142-3, are removed from their sockets and separated somewhat while leaving the slack cables 165 and air lines 109 in these pipes. This separation of the two bypass pipes, in the manner of opening a cage, provided clearance so that these working parts of the airgun can be extracted from the streamer.

It is to be noted that there is an annular space 230 (FIGS. 4A and 4B) within each sleeve 22 surrounding the firing chamber cylinder housing 156. Thus, there is more overall flexibility available in the streamer 12 than if the sleeves 22 were attached to each airgun near the end flange 202.

As shown in FIGS. 12A and 12B, a plurality of airgun streamers 12 can be towed behind a survey vessel 10 in an array 232 extending over a total distance of one or two kilometers or more behind the vessel. These airgun streamers may be arranged along a straight line as seen in FIG. 12A oriented slightly obliquely to the pathline of the vessel 10, or other relative positions may be used to provide various arrays 232.

Six steamers are shown by way of example. The towing head of the first streamer is connected by its towing cable 30 to the vessel. The other streamers have their towing cables 30 connected to streamlined floats 116 which in turn are being pulled by towing cables 117 extending to the vessel. A pair of outriggers 118 may be used to enlarge the effective towing width of the vessel. For all of the airgun streamers except the first one, their bundles 52 of air and control lines are shown extending from the vessel along their respective towing cables 117 to their respective floats 116. Then, from the aft end of each float 116, the bundles 52 of air lines and electrical lines extend down to the towing head of the respective streamer. Each towing cable 117, together with the bundle of air and electrical lines extending therealong, may be surrounded by a shrink-fit plastic sleeve in which is also included enough foamed plastic material to make a buoyant umbilical cord extending from the vessel to each float 116.

It is to be understood that these drawings and this detailed description are intended to be interpreted as illustrative of the present invention and that various changes and modifications as may occur to those skilled in the art can be made in the apparatus shown and various equivalent elements can be substituted for those shown all without departing from the spirit and scope of this invention as claimed.

By maintaining a spare airgun streamer on board the vessel, any one of the streamers can be pulled on board for servicing to be replaced with the spare, thus enabling the survey operation to continue while servicing of the airgun equipment is proceeding.

It is to be understood that seismic energy waveshape control methods and apparatus, as shown in U.S. Pat. No. 3,653,460, can conveniently be employed with the airgun streamer. One or more additional bulkheads each having an air flow orifice therein as shown in that patent can be positioned in the firing chamber 132 (FIGS. 4A and 4B). Such an additional bulkhead or bulkheads is located between the chamber-closure bulkhead 208 and the air-releasing shuttle 130. Cylindrical spacers, such as A, B, C and D, serve to hold such an additional orifice-containing waveshape control bulkhead or bulkheads in position.

It is to be understood that other sizes of spacers and other sizes of firing chambers can be used as may be desired by the survey crew.

Thus, the survey crew are enabled to synthesize a great many seismic impulse waveshapes by the large numbers of airguns which can be conveniently simultaneously towed as shown in FIGS. 1 and 12A and 12B.

Furthermore, the large number of individual airguns 20 can be spaced apart along the streamer 12 and in the sequence 232 of streamers such that the bubbles created in the surrounding water 18 upon discharge of the high pressure air into the water do not coalesce. Thus, the peak pressure appearing in the far field seismic signal is greatly enhanced.

The far field seismic signal occurs (as a rough rule of thumb) at a distance from the streamer 12 or from the array 232 of streamers which is equal to or greater than approximately ten wavelengths at the frequency involved.

The reason that the peak pressure appearing in the far field seismic signal is enhanced is that this peak pressure is approximately proportional to the cube root of the firing chamber volume for the bubble produced. Thus, when the bubbles from multiple airguns coalesce to form one larger bubble, the peak pressure created increases only as the cube root of the sum of their firing chamber volumes. Conversely, when the airgun spcing is sufficiently great that the bubbles do not coalesce, then the effect of their individual peak pressures are directly additive. For example, four airguns each having a firing chamber volume of 80 cubic inches when spaced sufficiently far apart produce a peak pressure of approximately 8 bar meters; whereas, a single bubble produced from a total firing chamber volume of 2,000 cubic inches produces a peak pressure of approximately 7 bar meters.

Thus, a large number of spaced airguns having relatively small firing chamber volumes can be used in the streamer or in multiple streamers for producing a high peak pressure in the far field seismic signal, while the overall air consumption of such numerous small firing chambers is no greater than that of fewer guns with much larger chambers.

If desired, the sleeves 22 may be made stiffer near their ends and more stretchable in their middle portions by using more or stiffer reinforcement 80 near their ends. Thus, these sleeves 22 resist the powerful impulses occurring in the water near the discharge ports 45 and thereby resist deterioration and resist the absorption of energy from these impulses. Whereas, their more stretchable middle portions, which are remote from the discharge ports 45, are rendered more readily inflatable and expandable for controllably changing buoyancy due to their greater stretchability there.

It is also to be understood that one or more of the airguns can be positioned sufficiently close together in the streamer 12 that their bubbles coalesce, if desired, by the survey crew.

I claim:

1. The method of employing airguns each having a plurality of neighboring discharge ports for generating marine seismic impulses comprising the steps of:
   positioning a plurality of such airguns of generally elongated cylindrical configuration in axial alignment along a line at spaced positions,
   interconnecting each axially aligned airgun in the line to the next successive airgun by a flexible sleeve axially aligned with the respective airguns to which it is connected for forming chambers within the sleeves between successive airguns while leaving all of the neighboring discharge ports of each airgun exposed to the ambient between the successive flexible sleeves, thereby forming a flexible steamer in which said airguns are axially aligned and having the discharge ports of all of the airguns therein exposed to the ambient,
   towing the airgun streamer from one end through the water, and
   feeding the high pressure compressed air along the streamer by-passing preceding airguns for supplying high pressure compressed air to each of the air guns in the streamer and suddenly discharging high pressure air through the exposed ports of the streamer for generating seismic impulses in the water.

2. The method of employing airguns each having a plurality of neighboring discharge ports for generating marine seismic impulses, as claimed in claim 1, including the steps of:
   feeding low pressure air into said chambers, and
   controlling the pressure of said low pressure air for controlling the effective buoyancy of said chambers.

3. The method of employing airguns each having a plurality of neighboring discharge ports for generating marine seismic impulses, as claimed in claim 1, including the steps of:
   providing at least one rigid passageway extending along exterior of and by-passing the neighboring discharge ports of each preceding airgun and extending between the successive chambers within the successive sleeves,
   mounting each said rigid passageway to resist the tremendous momentary forces involved during the sudden discharge of high pressure compressed air through the neighboring discharge ports, and
   supplying the high pressure compressed air for the succeeding airguns in the towed flexible streamer by feeding such compressed air through the preceding by-pass passageways and through the chambers.

4. The method of employing airguns each having a plurality of neighboring discharge ports for generating marine seismic impulses, as claimed in claim 2, including the steps of:
   providing a plurality of exterior passageways bypassing the neighboring discharge ports of each preceding airgun and communicating between the successive chambers within the successive sleeves,
   arranging each of said exterior passageways to resist the tremendous momentary forces involved during the abrupt discharge of high pressure compressed air through the neighboring discharge ports,
   supplying the high pressure compressed air for the succeeding airguns in the towed flexible streamer by feeding such compressed air through preceding by-pass passageways, and
   feeding low pressure air through said by-pass passages for equilizing the pressure of the low pressure air in the respective chambers controlling the effective buoyancy thereof.

5. The method of employing airguns each having a plurality of neighboring discharge ports for discharging high pressure compressed air therethrough for generating seismic impulses in the water and wherein the firing of each airgun is controlled by electrical signals fed thereto comprising the steps of:
   positioning a plurality of such airguns of generally elongated cylindrical configuration in axial alignment along a line at spaced positions,
   interconnecting the respective successive axially aligned airguns in the line to each other by respective successive flexible sleeves extending between successive airguns while leaving all of the neighboring discharge ports of each airgun exposed to the ambient between the successive flexible sleeves,
   providing a plurality of rigid by-pass passageways extending adjacent to exterior portions of a plurality of airguns by-passing the neighboring discharge ports of such airguns,
   mounting said rigid by-pass passageways to resist the tremendous momemtary forces involved during the abrupt discharge of high pressure air through the neighboring discharge ports,
   towing the line of interconnected airguns endwise through the water with one airgun positioned behindanother,
   feeding the electrical control signal for the succeeding airguns in the towed line of airguns through preceding by-pass passageways in the line, and
   supplying the high pressure compressed air for the succeeding airguns in the towed line of airguns through preceding by-pass passageways in the line for discharging the high pressure air through the exposed ports in the line of towed airguns for generating seismic impulses in the water.

6. The method of simultaneously employing a plurality of marine seismic survey airguns while enabling them to be conveniently controlled and handled comprising the steps of:
   providing a plurality of airguns of generally elongated cylindrical configuration each having the same diameter and each having a plurality of circumferentially spaced discharge ports located intermediate its ends,
   positioning the airguns along a line spaced apart one from another and arranged in spaced axially aligned relationship,
   providing a plurality of cylindrical flexible sleeves and interconnecting the sleeves in axially aligned relationship between each successive airgun along said line in watertight relationship therewith forming buoyancy chambers between the respective airguns while leaving their discharge ports exposed to the ambient, and thereby forming a long streamer with the airguns located at spaced points therealong, providing a plurality of rigid by-pass passages extending along the outside of each airgun in the region between the circumferentially spaced discharge ports for interconnecting the respective buoyancy chambers in watertight relationship through passages extending along the outside of the respective airguns and located between the respective discharge ports of each airgun, arranging each such rigid by-pass passage to withstand the tremendous momentary forces involved during the sudden discharge of high pressure compressed air through said discharge ports, providing a plurality of flexible high pressure air lines for the respective airguns for supplying high pressure compressed air thereto and extending said hose lines through the rigid by-pass passages and buoyancy chambers preceding the respective airguns supplied thereby, towing the streamer endwise through a body of water, and feeding high pressure compressed air through said air lines to the respective airguns in the streamer for discharge thereof through their discharge ports for generating seismic impulses in the water.

7. The method employing air guns having discharge ports for generating marine seismic impulses, as claimed in claim 2, including the steps of:

providing a survey vessel for towing the streamer having a launching channel extending over the stern, and increasing the pressure of said low pressure air for increasing the effective buoyancy of said chambers for floating the streamer at the surface of the water preparatory for hauling the streamer on board along said channel.

8. Airgun apparatus adapted for towing behind a survey vessel for generating seismic impulses in a body of water comprising:

a plurality of airguns spaced along a line, said airguns each having discharge ports, flexible sleeve means interconnecting said airguns forming a flexible streamer in which said airguns are located at spaced positions along said streamer and in which said discharge ports are exposed to ambient, towing means on said streamer for towing the streamer endwise through the water, said flexible sleeve means being adapted to provide for buoyancy in said flexible streamer, means for feeding high pressure compressed air along said streamer to the respective airguns therein for charging said airguns, and means for feeding electrical control signals along said streamer to the respective airguns therein for firing the airguns for discharging the high pressure compressed air through said discharge ports into the body of water for generating the seismic impulses, thereby providing a flexible airgun streamer containing a plurality of airguns which is convenient for handling and towing behind a survey vessel.

9. Airgun apparatus adapted for towing behind a survey vessel for generating seismic impulses in a body of water, as claimed in claim 8, in which:

watertight connector means detachably connect said sleeve means to said airguns thereby defining inflatable buoyancy chambers located within said sleeve means between the successive airguns in the flexible streamer, and means are provided for feeding low pressure compressed air along said streamer into the respective buoyancy chambers for changing their effective buoyancy.

10. Airgun apparatus adapted for towing behind a survey vessel for generating seismic impulses in a body of water, as claimed in claim 8, in which:

means are provided defining rigid by-pass passageways extending outside of the airguns past the discharge ports of the successive airguns along said streamer for withstanding the large momentary forces involved during the abrupt discharge of high pressure air through said ports, and said high pressure compressed air feeding means and said electrical control signals feeding means extend through said by-pass passageways.

11. Airgun apparatus adapted for towing behind a survey vessel for generating seismic impulses in a body of water, as claimed in claim 10, in which:

said means defining said by-pass passageways are a plurality of rigid tubular members extending along the exterior of each airgun and providing communication between the interior of the sleeve means preceding and succeeding each airgun, and said high pressure compressed air feeding means includes a plurality of flexible high pressure air hoses extending through rigid tubular members and extending through the interior of said flexible sleeve means.

12. Airgun apparatus adapted for towing behind a survey vessel for generating seismic impulses in a body of water, as claimed in claim 8, in which:

said flexible sleeve means are lengths of rubber hose having an internal diameter of approximately eight inches with layers of reinforcing strands embedded in the wall of said rubber hose.

13. Airgun apparatus for towing behind a survey vessel for generating seismic impulses in a body of water comprising:

a plurality of airguns, said airguns each having a generally elongated cylindrical configuration with discharge ports located intermediate the ends of the airgun, said airguns being arranged in spaced positions along a line in axially aligned relationship with the front end portion of each successive airgun along the line facing the rear end portion of each precedng airgun along the line, a plurality of flexible sleeves, one of said flexible sleeves extending between each airgun and the next successive airgun along the line, connector means for connecting the opposite ends of the respective sleeves to each airgun and to the next successive airgun with the ends of the respective sleeves encircling the rear end portion of each airgun and the front end portion of the next successive airgun for forming a flexible streamer, and high pressure compressed air feeding means extending along the streamer for supplying high pressure compressed air to each of the airguns for charging the airguns with such compressed air to be discharged through said discharge ports for generating the seismic impulses.

14. Airgun apparatus for towing behind a survey vessel for generating seismic impulses in a body of water comprising:

a plurality of airguns, said airguns each having a generally elongated cylindrical configuration with discharge ports located intermediate the ends of the airgun, said airguns being arranged in spaced positions along a line in axially aligned relationship with the front end portion of each successive airgun along the line facing the rear end portion of each preceding airgun along the line, a plurality of flexible sleeves, one of said flexible sleeves extending between each airgun and the next successive airgun along the line connector means for connecting the opposite ends of the respective sleeves to each airgun and to the next successive airgun with the ends of the respective sleeves encircling the rear end portion of each airgun and the front end portion of the next successive airgun for forming a flexible streamer, high pressure compressed air feeding means extending along the streamer for supplying high pressure compressed air to each of the airguns for charging the airguns with such compressed air to be discharged through said discharge ports for generating the seismic impulses, said connector means for each sleeve comprising two cylindrical barrels inserted within the opposite ends of the sleeve and having the sleeve clamped thereto in watertight relationship, said cylindrical barrels having flanges projecting beyond the ends of said sleeves, the cylindrical barrel at one end of each sleeve being slidable onto the rear end portion of one airgun and the cylindrical barrel at the opposite end of that sleeve being slidable over the front end portion of the next successive airgun along the line, a pair of removable clamp rings for each airgun each engageable with one of said flanges, one of said clamp rings of each pair encircling the front end portion of the airgun in clamping engagement with the flange of the cylindrical barrel thereon for connecting one end of a sleeve to the front end portion of the airgun, and the other clamp ring of each pair encircling the rear end portion of the airgun in clamping engagement with the flange of the cylindrical barrel thereon for connecting one end of a sleeve to the rear end portion of the airgun.

15. Airgun apparatus for towing behind a survey vessel for generating seismic impulses in a body of water, as claimed in claim 14, in which:

the rear end portion of each airgun is elongated for containing a firing chamber for holding the charge of compressed air in the airgun prior to firing, and the rear end portion has a smaller outside diameter than the inside diameter of the sleeve in encircling relationship therewith for extending into the sleeve with an annular clearance within the sleeve around said elongated rear end portion, thereby providing flexibility in the portion of the sleeve around said elongated rear end portion.

16. Airgun apparatus for towing behind a survey vessel for generating seismic impulses in a body of water, as claimed in claim 15, in which:

there are front and rear sections of enlarged diameter on the front and rear end portions of the airgun onto which said cylindrical barrels are slidable, said sections of enlarged diameter having ports therein communicating with the interior of said sleeves, and a plurality of rigid by-pass tubular members extending outside of the airgun between the respective pots in the enlarged front and rear sections on the airgun.

17. Airgun apparatus for towing behind a survey vessel for generating seismic impulses in a body of water, as claimed in claim 16, in which:

said front section of enlarged diameter is a head member secured onto the front end portion of the airgun in watertight relationship.

18. Airgun apparatus for towing behind a survey vessel for generating seismic impulses in a body of water, as claimed in claim 16, in which:

said rear section of enlarged diameter includes a flange encircling the airgun, said flange being located at the juncture of the main cylinder housing and firing chamber cylinder housing of the airgun.

19. Airgun apparatus for towing behind a survey vessel for generating seismic impulses in a body of water, as claimed in claim 16, in which:

said rear section of enlarged diameter includes adjacent abutting flanges encircling the airgun, one of said flanges being located on the main cylinder housing of the airgun and the other being located on the firing chamber cylinder housing thereof.

20. Airgun apparatus adapted for towing behind a survey vessel for generating seismic impulses in a body of water, as claimed in claim 8, in which:

each of said airguns has the same diameter and the same weight but at least some of said airguns have different firing chamber volumes in which to hold the high pressure compressed air prior to discharge thereof through said ports.

21. Airgun marine seismic apparatus adapted for towing in a body of water behind a vessel for generating seismic impulses in the water comprising:

multiple airguns each having a generally elongated cylindrical shape and being positioned in spaced axially aligned relationship, said airguns each having their discharge ports for suddenly releasing high pressure compressed air into the water located in the airgun intermediate the front and rear ends of the airgun, multiple flexible sleeves, one of said flexible sleeves extending between each of said airguns, connection means for connecting each of these flexible sleeves in watertight relationship near the rear end of the preceding airgun and near the front end of the succeeding airgun with the discharge ports exposed between the ends of said sleeves, said flexible sleeves each defining a flexible chamber positioned between the respective airguns for forming a flexible streamer including multiple airguns arranged along the length of the streamer in spaced apart end-toward-end relationship, mechanical connection means mounted on one end of said streamer for towing the streamer through the water, a plurality of rigid tubular transfer members, at least one of said transfer members extending along beside each of said airguns past the discharge ports thereof for interconnecting the preceding and succeeding chambers in watertight relationship for providing communication between said chambers, a plurality of high pressure hose lines extending through a plurality of said chambers and passing through the transfer members for feeding high pressure compressed air along the streamer from the end where said mechanical connection means is mounted to the respective airguns for supplying the high pressure compressed air thereto, and a plurality of electrical control lines extending from said end of the streamer through a plurality of said chambers and passing through the transfer members for feeding electrical firing control signals to the respective airguns for causing them to discharge the high pressure compressed air through their discharge ports.

22. Airgun apparatus for towing behind a survey vessel for generating seismic impulses in a body of water comprising:

multiple pluralities of airguns, each airgun having a discharge port, multiple pluralities of flexible sleeves, the flexible sleeves of each plurality interconnecting the airguns of each plurality for forming multiple elongated flexible airgun streamers each containing a plurality of airguns spaced therealong with their discharge ports exposed to the ambient, towing connection means mounted at the front end of each of said streamers, flexible air lines extending along each airgun streamer for feeding high pressure compressed air from the front end thereof to the respective airguns therein, flexible electrical lines extending along each airgun streamer for feedng electrical control signals from the front end thereof to the respective airguns therein for controlling their discharge of high pressure compressed air through said ports, a plurality of rigid passage means extending along beside respective airguns of each streamer past the discharge port thereof and being mounted for withstanding the tremendous momentary forces involved during the abrupt discharge of high pressure compressed air therethrough, said flexible air lines and flexible electrical lines extending through the respective preceding rigid passage means in each streamer to the respective airguns, and towing means for supplying high pressure compressed air and electrical control signals to the front ends of the respective air lines and electrical lines in each of the multiple streamers, said towng means including towing cables for simultaneously towing said multiple airgun streamers behind a survey vessel positioned in spaced relationship along a line one-after-another with said multiple streamers extending along said line for a total distance of at least one kilometer for providing strong peak pressure in the water in the far field seismic signal generated by the effect of firing all of said multiple pluralities of airguns spaced apart along said distance.

23. The method for employing a plurality of airguns having discharge ports through which high pressure compressed air is suddenly discharged into a body of water for generating powerful seismic energy therein, said method enabling the plurality of airguns to be conveniently towed through the water and to be conveniently handled and comprising the steps of:

providing a plurality of airguns of generally elongated cylindrical configuration and each having a plurality of circumferentially spaced discharge ports located intermediate the ends of the airgun, positioning the airguns in axially aligned relationship with their respective rear ends being spaced from the respective front ends of succeeding airguns, providing a plurality of flexible sleeves, positioning respective ones of said sleeves between the respective successive airguns and with the respective ends of each sleeve encircling the rear end and the front end of the airguns between which the sleeve is positioned, connecting the respective ends of each sleeve in encircling relationship to the rear end and to the front end of the airguns between which it is positioned, while leaving the circumferantially spaced discharge ports of each airgun directly exposed to the ambient between the respective successive flexible sleeves, thereby forming a flexible streamer adapted to be towed through the body of water, supplying the high pressure compressed air to the successive airguns in said streamer by feeding the compressed air through rigid by-pass passageways extending along the outside of the preceding airguns and located between the circumferentially spaced discharge ports thereof for by-passing the preceding airguns in the streamer, and arranging said rigid by-pass passageways to resist the tremendous momentary forces involved during the sudden discharge of the high pressure compressed air through said discharge ports.

24. Method of employing airguns having discharge ports for discharging high pressure compressed air therethrough for generating seismic impulses in the water and wherein the firing of each airgun is controlled by electrical signals fed thereto comprising the steps of:

positioning a plurality of airguns along a line at spaced positions, interconnecting each airgun in the line to the next successive airgun by a flexible sleeve for forming chambers within the sleeves extending between successive airguns while leaving the discharge ports of each airgun exposed to the ambient between the successive flexible sleeves, providing a plurality of by-pass passageways by-passing the discharge ports of each airgun and extending between the successive chambers in the line of interconnected airguns, towing the line of interconnected airguns endwise through the water with one airgun positioned behind another, feeding the electrical control signals for the succeeding airguns in the towed line of airguns through preceding by-pass passageways in the line, supplying the high pressure compressed air for the succeeding airguns in the towed line of airguns through preceding by-pass passageways in the line for discharging the high pressure air through the exposed ports in the line of towed airguns for generating seismic impulses in the water, sensing the depth of the front and rear ends of the line of towed airguns, feeding low pressure air through by-pass passages in the line into the chambers within the sleeves for equalizing the pressure thereof in each of said chambers, and controlling the pressure of said low pressure air for controlling the effective buoyancy of said chambers.

25. Airgun apparatus adapted for towing behind a survey vessel for generating seismic impulses in a body of water comprising:

a plurality of airguns spaced along a line, said airguns each having discharge ports, flexible sleeve means interconnecting said airguns forming a flexible streamer in which said airguns are located at spaced positions along said streamer and in which said discharge ports are exposed to ambient, towing means on said streamer for towing the streamer endwise through the water, said flexible sleeve means being adapted to provide for buoyancy in said flexible streamer, means for feeding high pressure compressed air along said streamer to the respective airguns therein for charging said airguns, means for feeding electrical control signals along said streamer to the respective airguns therein for firing the airguns for discharging the high pressure compressed air through said discharge ports into the body of water for generating the seismic impulses, thereby providing a flexible airgun streamer containing a plurality of airguns which is convenient for handling and towing behind a survey vessel, said flexible sleeve means being lengths of expandable hose having an internal diameter of approximately eight inches with layers of reinforcing strands embedded in the wall of said expandable hose, said lengths of expandable hose being more heavily reinforced near their ends for withstanding the seismic impulses as they are generated in the water near said discharge ports, and the middle portions of said lengths of expandable hose being less heavily reinforced for increasing the expandability of said middle portions in response to the feeding of compressed air into the interior of said lengths of expandable hose for controlling the effective buoyancy of said sleeve means.

26. The method of simultaneously employing a plurality of marine seismic survey airguns while enabling them to be conveniently controlled and handled as claimed in claim 8, in which the firing of each airgun is controlled by electrical signals fed thereto comprising the further steps of:

providing a plurality of flexible electrical lines for controlling the respective airguns and extending said electrical lines through the rigid by-pass passages and buoyancy chambers preceding the respective airguns controlled thereby.

27. The method for employing a plurality of airguns having discharge ports through which high pressure compressed air is suddenly discharged into a body of water for generating powerful seismic energy therein and wherein the firing of each airgun is controlled by electrical signals fed thereto said method enabling the plurality of airguns to be conveniently towed through the water and to be conveniently handled and comprising the steps of:

providing a plurality of airguns of generally elongated cylindrical configuration and each having a plurality of circumferentially spaced discharge ports located intermediate the ends of the airgun, arranging for firing chamber volumes of the respective airguns to be changeable while maintaining the overall weight of each airgun the same, positioning the airguns in axially aligned relationship with their respective rear ends being spaced from the respective front ends of succeeding airguns, providing a plurality of cylindrical flexible sleeves, positioning respective ones of said sleeves between the respective successive airguns, connecting the respective ends of each sleeve in concentric relationship to the rear end and to the front end of the airguns between which it is positioned, while leaving the circumferentially spaced discharge ports of each airgun directly exposed to the ambient between the respective successive flexible sleeves, providing a plurality of rigid passage members extending exterior of the respective airguns by-passing the circumferentially spaced discharge ports of the respective airgun for interconnecting the interior of the respective flexible sleeves connected thereto, providing a plurality of flexible high pressure air lines for the respective airguns for supplying high pressure compressed air thereto and extending said air lines through the rigid passage members and flexible sleeves preceding the respective airguns supplied thereby, and providing a plurality of flexible electrical lines for controlling the respective airguns and extending said electrical lines through the rigid passage members and flexible sleeves preceding the respective airguns controlled thereby.

28. Airgun apparatus adapted for towing behing a survey vessel for generating seismic impulses in a body of water comprising:

a plurality of airguns spaced along a line, said airguns each having discharge ports, flexible sleeve means interconnecting said airguns forming a flexible streamer in which said airguns are located at spaced positions a long said streamer and in which said discharge ports are exposed to ambient, towing means on said streamer for towing the streamer endwise through the water, said flexible sleeve means being adapted to provide for buoyancy in said flexible streamer, means for feeding high pressure compressed air along said streamer to the respective airguns therein for charging said airguns, means for feeding electrical control signals along said streamer to the respective airguns therein for firing the airguns for discharging the high pressure compressed air through said discharge ports into the body of water for generating the seismic impulses, the rear end portion of each airgun comprising a cylindrical housing for providing a firing chamber, said cylindrical housing being open at the rear end thereof, a plurality of cylindrical spacers removably positioned in said cylindrical housing and being slidable into said housing through said open rear end, a removable circular bulkhead slidable into said cylindrical housing through said open rear end and being held in position in said cylindrical housing by said spacers, said bulkhead having sealing means around the perimeter thereof for engaging the interior of said cylindrical housing in airtight relationship for holding high pressure compressed air in said firing chamber, a retainer member removably secured over said open end for retaining said spacers and said bulkhead in position in said cylindrical housing, whereby the volume of said firing chamber can be changed by interchanging the relative positions of said spacers and said bulkhead, and thereby providing a flexible airgun streamer containing a plurality of airguns having changeable firing chamber volumes and which is convenient for handling and towing behind a survey vessel.

* * * * *